US010154487B2

United States Patent
Chang

(10) Patent No.: US 10,154,487 B2
(45) Date of Patent: Dec. 11, 2018

(54) DATA FLOW RELAY DEVICE AND COMMUNICATION DEVICE

(71) Applicant: Quanta Computer Inc., Taoyuan (TW)

(72) Inventor: Huang-Chin Chang, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 191 days.

(21) Appl. No.: 15/009,031

(22) Filed: Jan. 28, 2016

(65) Prior Publication Data
US 2017/0111903 A1     Apr. 20, 2017

(30) Foreign Application Priority Data

Oct. 15, 2015    (TW) .............................. 104133812 A

(51) Int. Cl.
*H04L 29/08*     (2006.01)
*H04W 56/00*   (2009.01)
(Continued)

(52) U.S. Cl.
CPC ....... *H04W 72/0446* (2013.01); *H04L 67/108* (2013.01); *H04L 69/28* (2013.01);
(Continued)

(58) Field of Classification Search
CPC .............. H04W 56/00; H04W 56/001; H04W 56/0015; H04W 56/0025; H04W 56/004;
(Continued)

(56) References Cited

U.S. PATENT DOCUMENTS 6,973,151 B2 * 12/2005 Lysdal .................. H04J 3/0682
370/419
8,699,453 B2 * 4/2014 Sundarraman .... H04W 72/0413
370/331
(Continued)

FOREIGN PATENT DOCUMENTS

CN     102342049 A  *  2/2012   ........ H04W 56/0005
CN     102612135 A  *  7/2012
(Continued)

OTHER PUBLICATIONS

Chinese language office action dated Jul. 29, 2016, issued in application No. TW 104133812.

*Primary Examiner* — Eric Nowlin
(74) *Attorney, Agent, or Firm* — McClure, Qualey & Rodack, LLP

(57) ABSTRACT

A data flow relay device includes a mobile communications device, a proprietary grand master and a transmitting and receiving device. The mobile communications device generates multiple wireless signals for communicating with a peer communications device and generates a clock signal and obtains information regarding a signal of a start phase of a frame and information regarding a total propagation delay according to the wireless signals. The proprietary grand master adjusts a reference clock according to the clock signal, the information regarding the signal and the information regarding the total propagation delay, such that a phase of the reference clock is synchronized with a phase utilized by the peer communications device. The proprietary grand master further generates a packet including information regarding the reference clock. The transmitting and receiving device receives the packet and transmits the packet to a back-end communications device.

7 Claims, 5 Drawing Sheets

(51) Int. Cl.
*H04W 72/04* (2009.01)
*H04W 88/04* (2009.01)
*H04L 29/06* (2006.01)
*H04W 84/04* (2009.01)

(52) U.S. Cl.
CPC ...... *H04W 56/0015* (2013.01); *H04W 84/045* (2013.01); *H04W 88/04* (2013.01)

(58) Field of Classification Search
CPC ......... H04W 56/0045; H04W 72/0046; H04W 84/045; H04W 88/04; H04L 27/2655; H04L 67/108; H04B 7/2656; H04B 7/2675; H04B 7/269
See application file for complete search history.

(56) References Cited

U.S. PATENT DOCUMENTS

| | | | | |
|---|---|---|---|---|
| 8,824,343 | B2* | 9/2014 | Zhu | H04W 56/0015 370/277 |
| 9,042,903 | B2* | 5/2015 | Khude | H04W 56/0045 455/450 |
| 9,357,514 | B2* | 5/2016 | Zou | H04W 56/0015 |
| 9,392,562 | B2* | 7/2016 | Patel | H04W 56/0015 |
| 9,642,105 | B2* | 5/2017 | Patel | H04W 56/0015 |
| 9,681,346 | B2* | 6/2017 | Wang | H04W 36/0072 |
| 9,781,606 | B2* | 10/2017 | Yilmaz | H04W 16/14 |
| 2002/0110212 | A1* | 8/2002 | Lysdal | H04J 3/0682 375/371 |
| 2003/0081709 | A1* | 5/2003 | Ngo | H03L 7/07 375/362 |
| 2010/0111070 | A1* | 5/2010 | Hsu | H04J 3/0682 370/350 |
| 2010/0157906 | A1* | 6/2010 | Yang | H04W 56/001 370/328 |
| 2010/0195627 | A1* | 8/2010 | Sundarraman | H04W 56/0055 370/336 |
| 2010/0222068 | A1* | 9/2010 | Gaal | H04W 56/0005 455/450 |
| 2011/0274149 | A1 | 11/2011 | Xu et al. | |
| 2011/0281571 | A1* | 11/2011 | Patel | H04W 56/0015 455/418 |
| 2011/0281574 | A1* | 11/2011 | Patel | H04W 56/0015 455/422.1 |
| 2012/0230282 | A1* | 9/2012 | Wu | H04W 28/16 370/329 |
| 2012/0231807 | A1* | 9/2012 | Kong | H04W 56/0035 455/456.1 |
| 2012/0236977 | A1* | 9/2012 | Zou | H04W 56/0015 375/354 |
| 2012/0263093 | A1* | 10/2012 | Roessel | H04L 5/0053 370/312 |
| 2013/0010658 | A1* | 1/2013 | Zhu | H04W 56/0015 370/280 |
| 2013/0143497 | A1* | 6/2013 | Das | G01S 5/14 455/41.2 |
| 2013/0223227 | A1* | 8/2013 | Lee | H04B 7/15557 370/236 |
| 2013/0343372 | A1* | 12/2013 | Whinnett | H04W 56/0015 370/344 |
| 2014/0185520 | A1* | 7/2014 | Gao | H04W 64/00 370/328 |
| 2014/0194130 | A1* | 7/2014 | Khude | H04W 56/0045 455/450 |
| 2015/0079996 | A1* | 3/2015 | Wang | H04W 36/0072 455/437 |
| 2015/0312870 | A1* | 10/2015 | Koorapaty | H04W 56/0015 370/350 |
| 2016/0066290 | A1* | 3/2016 | Cohen | H04W 56/0015 370/336 |
| 2016/0212632 | A1* | 7/2016 | Katamreddy | H04W 8/005 |
| 2016/0277937 | A1* | 9/2016 | Yilmaz | H04W 16/14 |
| 2017/0230927 | A1* | 8/2017 | Zampetti | H04W 4/021 |

FOREIGN PATENT DOCUMENTS

| | | | | |
|---|---|---|---|---|
| CN | 104904285 A | * | 9/2015 | ........ H04W 56/0045 |
| EP | 2404396 A2 | * | 1/2012 | ........ H04W 56/0005 |
| EP | 2472755 A1 | | 7/2012 | ........ H04W 56/0005 |
| EP | 2944138 A1 | * | 11/2015 | ........ H04W 56/0045 |
| KR | 20110128331 A | * | 11/2011 | ........ H04W 56/0005 |
| WO | WO 2010101939 A2 | * | 9/2010 | ........ H04W 56/0005 |
| WO | WO 2010101939 A3 | * | 12/2010 | ........ H04W 56/0005 |
| WO | WO 2011063044 A1 | * | 5/2011 | ........ H04W 56/0015 |
| WO | WO 2014110422 A1 | * | 7/2014 | ........ H04W 56/0045 |
| WO | WO 2015057156 A2 | * | 4/2015 | ........ H04W 56/0015 |
| WO | WO 2016163923 A1 | * | 10/2016 | ........... G01S 5/0263 |

\* cited by examiner

DATA FLOW RELAY DEVICE AND COMMUNICATION DEVICE

CROSS REFERENCE TO RELATED APPLICATIONS

This Application claims priority of Taiwan Patent Application No. 104133812, filed on Oct. 15, 2015, the entirety of which is incorporated by reference herein.

BACKGROUND OF THE INVENTION

Field of the Invention

The invention relates to a communications device, and more particularly to a communications device capable of synchronizing timing with a peer communications device.

Description of the Related Art

A femtocell is a small, low-power cellular base station, typically designed for use in a home or small business. It connects to the service provider's network via broadband (such as a DSL, a cable or a fiber). A femtocell allows service providers to extend service coverage indoors or at the cell edge.

Use of femtocells benefits both the mobile operator and the consumer. For a mobile operator, the attractions of the femtocell are improvements to both coverage, especially indoors, and capacity. Coverage is improved because femtocells can fill in the gaps and eliminate loss of signal through buildings. Capacity is improved by a reduction in the number of phones attempting to use the main network cells and by the off-load of traffic through the user's network (via the Internet) to the operator's infrastructure. Instead of using the operator's private network (microwave links, etc.), the Internet is used.

Consumers benefit from improved coverage since they have a base-station inside their building. As a result, the mobile phone (user equipment) achieves the same or higher data rates using less power, thus battery life is longer. They may also get better voice quality.

Considering the benefits in using the femtocells, further expanding the application levels of the femtocell has great commercial values.

BRIEF SUMMARY OF THE INVENTION

Data flow relay devices and communications devices are provided. An exemplary embodiment of a data flow relay device comprises a mobile communications device, a proprietary grand master and a transmitting and receiving device. The mobile communications device generates a plurality of wireless signals for communicating with a peer communications device, and generates a clock signal and obtains information regarding a signal of a start phase of a frame and information regarding a total propagation delay according to the wireless signals. A frequency of the clock signal is synchronized with that of a clock signal of the peer communications device. The information regarding the signal comprises information regarding a start phase of a frame of the peer communications device. The information regarding the total propagation delay comprises information regarding a propagation delay caused by a distance between the data flow relay device and the peer communications device and a calculation delay caused by signal calculation in a signal processing device. The proprietary grand master is coupled to the mobile communications device, receives the clock signal, the information regarding the signal and the information regarding the total propagation delay from the mobile communications device, adjusts a reference clock according to the clock signal, the information regarding the signal and the information regarding the total propagation delay, such that a phase of the reference clock is synchronized with a phase utilized by the peer communications device. The proprietary grand master further generates a packet comprising information regarding the reference clock. The transmitting and receiving device is coupled to the proprietary grand master, receives the packet from the proprietary grand master and transmits the packet to a back-end communications device.

An exemplary embodiment of a communications device comprises a data flow relay device and a back-end communications device. The data flow relay device communicates with a peer communications device via a plurality of wireless signals, generates a reference clock having a phase synchronized with a phase utilized by the peer communications device according to the wireless signals and generates a packet comprising information regarding the reference clock. The back-end communications device receives the packet and adjusts a local clock according to the packet such that a phase of the local clock is synchronized with a phase utilized by the peer communications device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
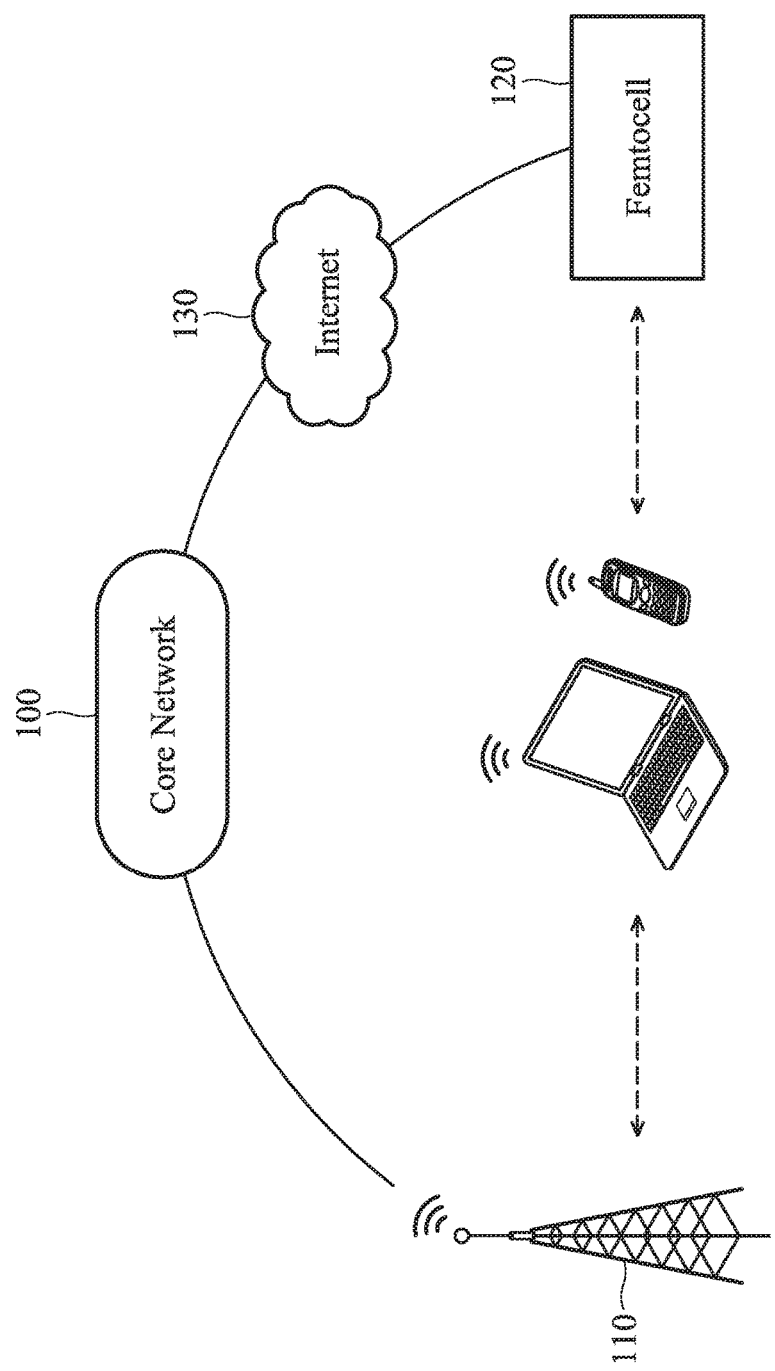
FIG. 1 shows a conventional network topology.

FIG. 1 shows a conventional network topology. Generally, a macro cell 110 enters the core network 100 of a service provider via specific lines. The femtocell 120 connects to service provider's Internet 130 via broadband wires (such as a DSL, a cable or a fiber), and then enters the core network 100 of the service provider.

Since in the conventional designs, physical wires are required for the femtocell 120 to enter the core network, the last-mile problem cannot be overcome. That is, in the conventional design, the femtocell cannot be used in the area of the subscribers without the broadband wiring.

Figure 2:
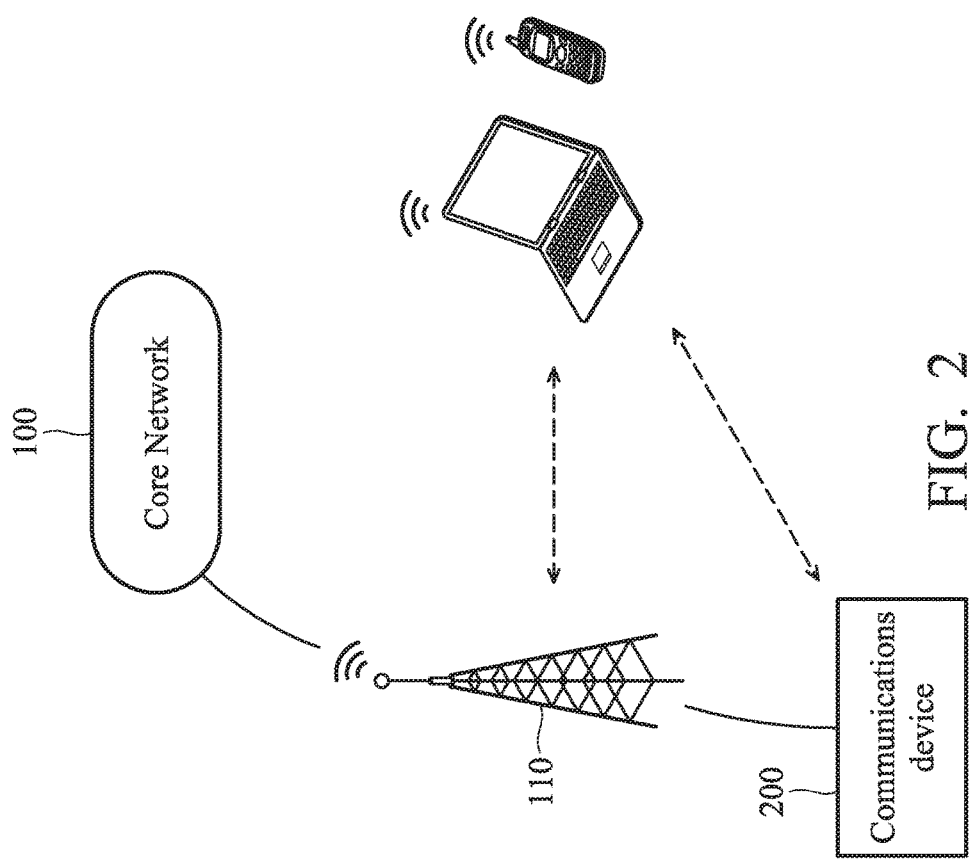
FIG. 2 shows a novel network topology according to an embodiment of the invention.

FIG. 2 shows a novel network topology according to an embodiment of the invention. To solve the problem above, in the novel network topology, the femtocell communicates with the macro cell and then enters the core network wirelessly instead of using the physical wires (such as a DSL, a cable or a fiber). However, if the timing of the femtocell and the macro cell cannot be synchronized with each other, interference among the mobile phone, the femtocell and the macro cell may occur. For example, the satellite signals are usually used by each base station as the standard timing basis. However, since the femtocells are usually deployed inside the buildings, when the femtocell is located deep inside of a house where the satellite signals cannot reach, the problem of being unable to receive a stable and efficient standard timing basis will occur, and the timing of the femtocell cannot be synchronized with that of the macro cell. In this manner, when performing handover the subscribers at the cell edges between the macro cell and the femtocell, interference or even handover failure would occur.

To solve this problem, a communications device 200 capable of synchronizing timing between a back-end communications device (such as a femtocell) and a macro cell is proposed and will be illustrated further in the following paragraphs. Note that the femtocell illustrated above may be one of a plurality of possible implementations of the communications device and the application should not be limited thereto. The application can certainly be applied in any back-end communications device which is unable to obtain a stable and efficient clock source, or any communications device which has to synchronize the timing with another peer communications device (such as the macro cell as illustrated above), or any communications device which is unable to receive the satellite signals to obtain information regarding the standard timing basis, or others.

Figure 3:
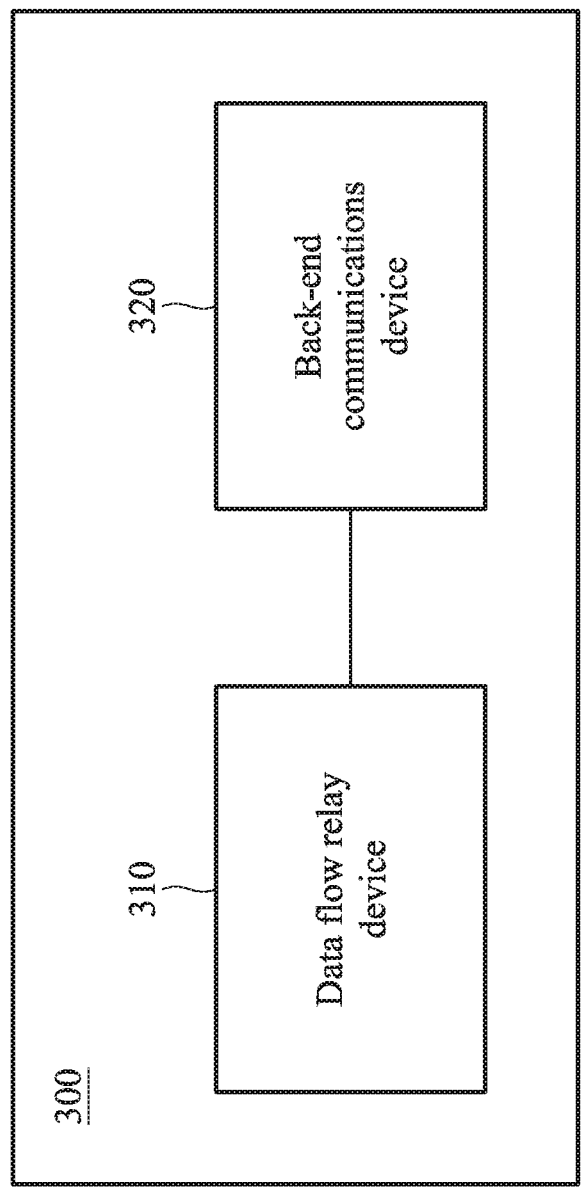
FIG. 3 shows an exemplary block diagram of a communications device according to an embodiment of the invention.

FIG. 3 shows an exemplary block diagram of a communications device according to an embodiment of the invention. According to an embodiment of the invention, the communications device 300 may comprise a data flow relay device 310 and a back-end communications device 320. The data flow relay device 310 may be coupled to the back-end communications device 320 via physical wires or may be coupled to the back-end communications device 320 without physical wires. When the data flow relay device 310 is coupled to the back-end communications device 320 via physical wires, the data flow relay device 310 may communicate with the back-end communications device 320 in a wired manner. When the data flow relay device 310 is coupled to the back-end communications device 320 without physical wires, the data flow relay device 310 may communicate with the back-end communications device 320 in a wireless manner.

According to an embodiment of the invention, the data flow relay device 310 may generate and transmit a plurality of wireless signals to a peer communications device, such as the macro cell 110 shown in FIG. 2, thereby communicating with the peer communications device via the wireless signals and generating a reference clock whose phase is synchronized with a phase utilized by the peer communications device according to the wireless signals. In addition, according to an embodiment of the invention, the data flow relay device 310 may further generate a packet comprising information regarding the reference clock and transmit the packet in either a wired or a wireless manner to the back-end communications device 320.

The back-end communications device 320 receives the packet and adjusts a local clock utilized by internal components of the back-end communications device 320 according to the packet, such that a phase of the local clock is synchronized with a phase utilized by the peer communications device.

Note that in other embodiments of the invention, the communications device may also comprise only a data flow relay device and communicate with a back-end communications device outside of the communications device in a wireless manner. In addition, the back-end communications device may be a femtocell, but is not limited thereto. As discussed above, the back-end communications device may be any back-end communications device which is unable to obtain a stable and efficient clock source, or any communications device which has to synchronize the timing with another peer communications device (such as the macro cell as illustrated above), or any communications device which is unable to receive the satellite signals to obtain information regarding the standard timing basis, or others.

Figure 4:
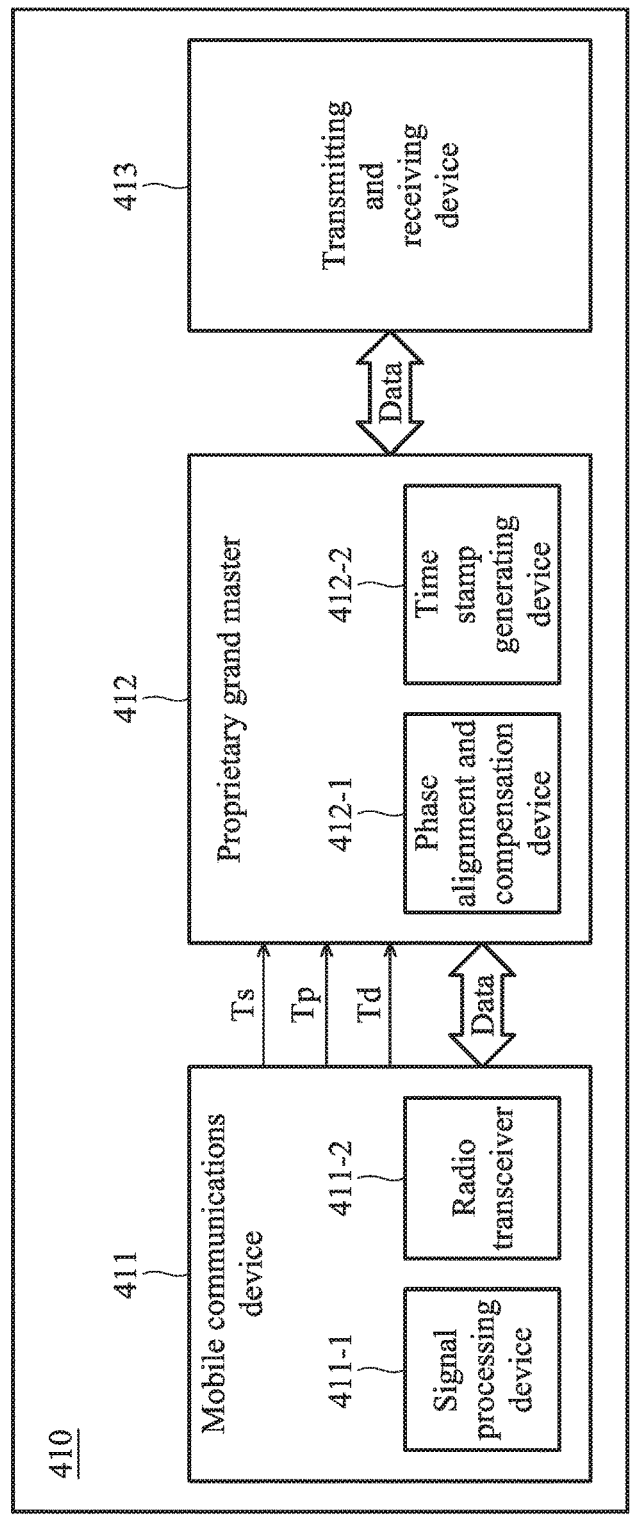
FIG. 4 shows an exemplary block diagram of a data flow relay device according to an embodiment of the invention.

FIG. 4 shows an exemplary block diagram of a data flow relay device according to an embodiment of the invention. According to an embodiment of the invention, the data flow relay device 410 may comprise a mobile communications device 411, a proprietary grand master (PGM) 412 and a transmitting and receiving device 413. The mobile communications device 411 may generate a plurality of wireless signals for communicating with the peer communications device, and generate a clock signal Ts and obtain information regarding a signal Tp of a start phase of a frame and information regarding a total propagation delay Td according to the wireless signals. According to an embodiment of the invention, the mobile communications device 411 may at least comprise a signal processing device 411-1 and a radio transceiver 411-2.

The signal processing device 411-1 may comprise a plurality of hardware devices performing baseband signal processing and radio frequency (RF) signal processing. The signal processing may comprise analog-to-digital conversion (ADC)/digital-to-analog conversion (DAC), gain adjustment, modulation/demodulation, encoding/decoding, frequency up-conversion/frequency down-conversion, filtering, power amplifying, or others. The radio transceiver 411-2 may comprise at least an antenna and an RF front-end circuit for processing the RF wireless signals that have been received or to be transmitted.

According to an embodiment of the invention, the mobile communications device 411 may receive the wireless signals carrying information regarding timing synchronization from the peer communications device, and generate the clock signal Ts and the radio frames that are synchronized with the peer communications device according to the information. The synchronization of the clock signal Ts means that a frequency of the clock signal Ts is synchronized with a frequency of a clock signal utilized by the peer communications device. That is, a frequency of the clock signal Ts is equal to or almost equal to a frequency of a clock signal utilized by the peer communications device.

In addition, since the mobile communications device 411 may obtain the signal Tp of a start phase of a frame of the peer communications device based on the timing synchronization signal processing mechanism, the mobile communications device 411 may generate radio frames that are synchronized in phase with the peer communications device. In addition, the mobile communications device 411 may further obtain the information regarding the propagation delay caused by a distance between the data flow relay device and the peer communications device based on the time advance mechanism, and combine the information regarding the propagation delay with the information regarding a calculation delay caused by signal calculation in the signal processing device 411-1 of the mobile communications device 411 to derive the total propagation delay Td.

According to an embodiment of the invention, the PGM 412 may be coupled to the mobile communications device 411, receive the clock signal Ts, the information regarding the signal Tp of a start phase of a frame and the information regarding the total propagation delay Td from the mobile communications device 411, and adjust a reference clock according to the clock signal Ts, the information regarding the signal Tp and/or the information regarding the total propagation delay Td, such that a phase of the reference clock is synchronized with a phase utilized by the peer communications device. Note that here, the synchronization comprises synchronization in both frequency and phase.

For example, the clock signal Ts generated by the mobile communications device 411 may be already synchronized in frequency with the peer communications device. The PGM 412 generates the reference clock based on the clock signal Ts. The PGM 412 may comprise a phase alignment and compensation device 412-1 to compensate the signal Tp of a start phase of a frame for the timing delay according to the information regarding the total propagation delay Td, so as to generate the signal whose phase is almost aligned with that of the peer communications device. After performing the frequency and phase alignment and compensation on the start phase of the frame, for the back-end communications device, the spatial locations of the peer communications device and the data flow relay device may be regarded as almost the same.

In addition, according to an embodiment of the invention, the PGM 412 may further generate a packet comprising information regarding the reference clock and transmit the packet via the transmitting and receiving device 413 (such as the Data shown in FIG. 4). For example, the PGM 412 may comprise a time stamp generating device 412-2. The time stamp generating device 412-2 may generate a time stamp according to the reference clock. The time stamp records the time for the packet being transmitted out and the packet comprising information regarding the time stamp is transmitted to the back-end communications device via the transmitting and receiving device 413. In addition, when the PGM 412 receives the replied packet from the back-end communications device, the time stamp generating device 412-2 may also generate a time stamp according to the reference clock to record the time for the packet being received by the transmitting and receiving device 413.

As discussed above, depending on how the data flow relay device 410 is coupled to the back-end communications device, the transmitting and receiving device 413 may transmit the packet comprising one or more time stamps to the back-end communications device in a wired or wireless manner.

Figure 5:
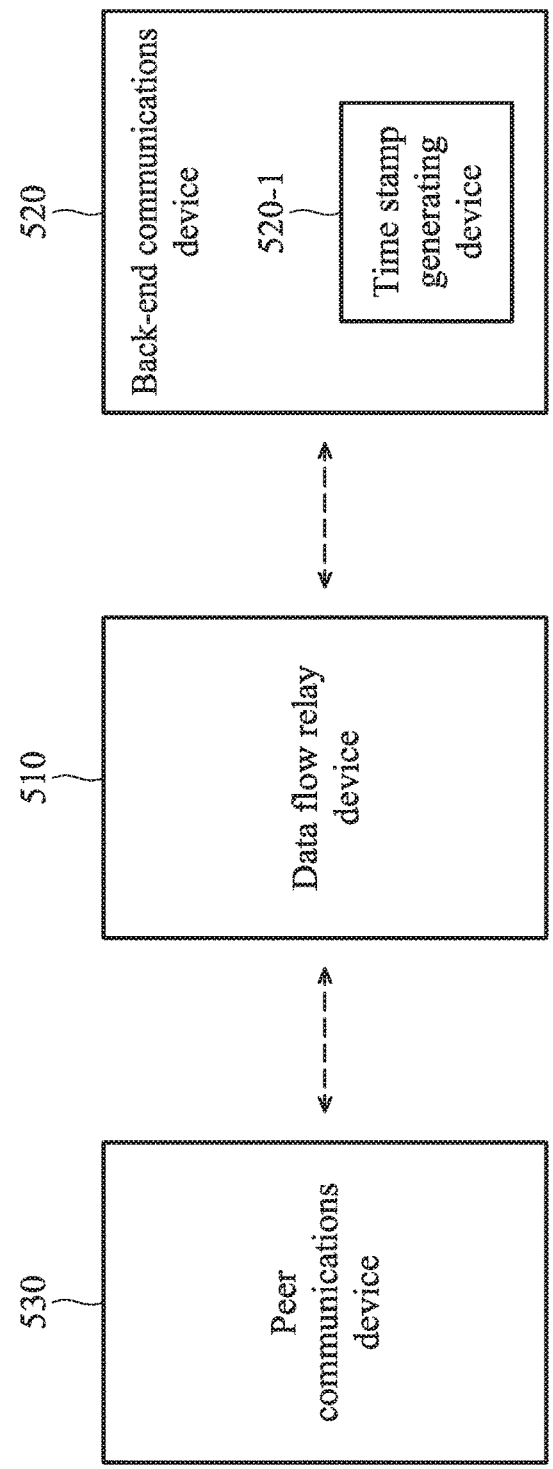
FIG. 5 is a schematic diagram showing how to synchronize timing with a peer communications device according to an embodiment of the invention.

FIG. 5 is a schematic diagram showing how to synchronize timing with a peer communications device according to an embodiment of the invention. According to an embodiment of the invention, the back-end communications device 520 may perform protocol layer communications with the data flow relay device 510 based on the time stamp principal, so as to obtain the packet link delay Ti between the back-end communications device 520 and the data flow relay device 510 and the timing error Te between the reference clock and the local clock of the back-end communications device according to the time stamps carried in the packet.

For example, the back-end communications device 520 may comprise a time stamp generating device 520-1. The time stamp generating device 520-1 may generate a time stamp recording the time for the packet being received. In addition, the time stamp generating device 520-1 may also generate another time stamp recording the time for the packet being transmitted back to the data flow relay device 510. As discussed above, the packet may be transmitted to the data flow relay device 510 in a wired or wireless manner depending on how the data flow relay device 510 is coupled to the back-end communications device 520.

The packet carrying the time stamps may be transmitted back and forth several times between the back-end communications device 520 and the data flow relay device 510, and the back-end communications device 520 may keep adjusting the local clock according to the time stamps carried in the packet and the packet link delay Ti, such that the timing error Te can gradually converge and finally the phase can converge. In this manner, a phase of the local clock of the back-end communications device 520 can synchronize with a phase utilized by the peer communications device 530. Here, the synchronization means the synchronization in the clock frequency and the start phase of the frame.

Based on the devices and methods as illustrated above, the timing of a back-end communications device (for example, a femtocell) that is located deep inside of a house where the satellite signals cannot reach, or the timing of any back-end communications device which is unable to obtain a stable and efficient clock source, or the timing of any communications device which has to synchronize the timing with another peer communications device (such as the macro cell as illustrated above), or the timing of any communications device which is unable to receive the satellite signals to obtain information regarding the standard timing basis, or others, can be synchronized with another peer communications device (such as the macro cell as illustrated above). Therefore, the problems of handover error or failure and the problems of data transmission error or failure that are caused by the timing asynchronization can be solved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data flow relay device, comprising:
a mobile communications device, generating a plurality of wireless signals for communicating with a peer communications device, and generating a first clock signal and obtaining a start phase signal and a total propagation delay according to the plurality of wireless signals, wherein a first frequency of the first clock signal is synchronized with that of a second clock signal of the peer communications device, the start phase signal comprises a first start phase of a first frame of the peer communications device, and the total propagation delay comprises a transmission delay caused by a distance between the data flow relay device and the peer communications device and a calculation delay caused by signal calculation in a signal processing device;
a proprietary grand master, coupled to the mobile communications device, receiving the first frequency of the first clock signal, the start phase signal and the total propagation delay from the mobile communications device, adjusting a reference clock according to the first frequency of the first clock signal, the start phase signal and the total propagation delay, such that a first phase of the reference clock is synchronized with a second phase utilized by the peer communications device, wherein the proprietary grand master further generates a packet comprising the reference clock; and a transmitting and receiving device, coupled to the proprietary grand master, receiving the packet from the proprietary grand master and transmitting the packet to a back-end communications device.

2. The data flow relay device as claimed in claim 1, wherein the proprietary grand master generate a time stamp according to the reference clock and the time stamp is transmitted to the back-end communications device via the packet.

3. The data flow relay device as claimed in claim 1, wherein a second start phase of a second frame of the proprietary grand master is synchronized with the second phase utilized by the peer communications device by performing phase alignment and compensation on the second start phase of the second frame of the proprietary grand master according to the total propagation delay and the start phase signal.

4. A communications device, comprising:

a data flow relay device, communicating with a peer communications device via a plurality of wireless signals, generating a reference clock having a first phase synchronized with a second phase utilized by the peer communications device according to the plurality of wireless signals and generating a packet comprising the reference clock; and a back-end communications device, receiving the packet and adjusting a local clock according to the packet such that a phase of the local clock is synchronized with the second phase utilized by the peer communications device, wherein the data flow relay device comprises:

a mobile communications device, generating the plurality of wireless signals for communicating with the peer communications device, and generating a first clock signal and obtaining a start phase signal and a total propagation delay according to the plurality of wireless signals, wherein a first frequency of the first clock signal is synchronized with that of a second clock signal of the peer communications device, the start phase signal comprises a first start phase of a first frame of the peer communications device, and the total propagation delay comprises a transmission delay caused by a distance between the data flow relay device and the peer communications device and a calculation delay caused by signal calculation in a signal processing device;

a proprietary grand master, coupled to the mobile communications device, receiving the first frequency of the first clock signal, the start phase signal and the total propagation delay from the mobile communications device, adjusting the reference clock according to the first frequency of the first clock signal, the start phase signal and the total propagation delay, such that the first phase of the reference clock is synchronized with the second phase utilized by the peer communications device, wherein the proprietary grand master further generates the packet; and a transmitting and receiving device, coupled to the proprietary grand master, receiving the packet and transmitting the packet to the back-end communications device.

5. The communications device as claimed in claim 4, wherein the proprietary grand master generates a time stamp according to the reference clock and the time stamp is transmitted to the back-end communications device via the packet.

6. The communications device as claimed in claim 5, wherein the back-end communications device estimates a timing error between the data flow relay device and the back-end communications device according to the time stamp and adjusts the local clock of the back-end communications device according to the timing error such that a phase of the local clock is synchronized with the second phase utilized by the peer communications device.

7. The communications device as claimed in claim 4, wherein a second start phase of a second frame of the back-end communications device is synchronized with a first start phase of a first frame of the peer communications device.

* * * * *